Figure 1:
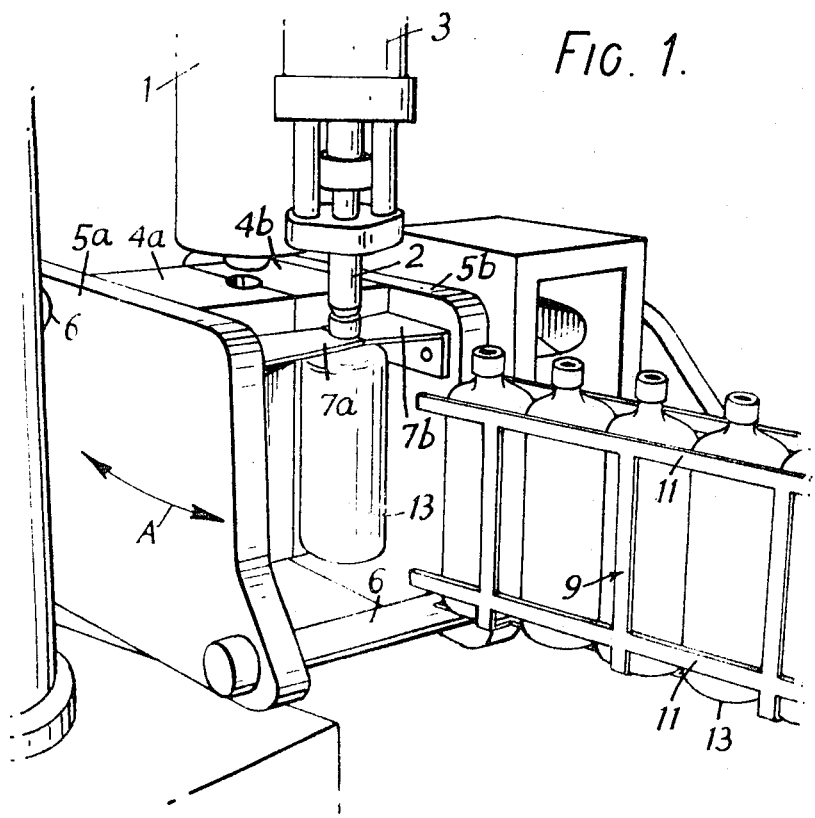

United States Patent

Saffron

[15] 3,659,998
[45] May 2, 1972

[54] BLOW-MOLDING MACHINES

[72] Inventor: Ronald G. Saffron, London, England

[73] Assignee: Hayssen Manufacturing Company, Sheboygan, Wis.

[22] Filed: May 25, 1970

[21] Appl. No.: 41,135

[52] U.S. Cl. ................................425/326, 264/98, 425/437
[51] Int. Cl. ..................................................B29c 17/07
[58] Field of Search ...............18/5 BM, 5 BA, 5 BB, 5 BC, 18/5 BE, 5 BT, 5 BP, 5 BR; 65/261, 263, 264; 264/96, 97, 98, 94

[56] References Cited

UNITED STATES PATENTS

| | | | |
|---|---|---|---|
| 3,081,489 | 3/1963 | Jackson et al. | 18/5 BA |
| 3,340,569 | 9/1967 | Hagen | 18/5 BA |
| 3,382,531 | 5/1968 | Hager | 264/94 X |

Primary Examiner—J. Spencer Overholser
Assistant Examiner—Norman E. Lehrer
Attorney—William Anthony Drucker

[57] ABSTRACT

A machine for blow-molding hollow articles has an extruder and a blowing mandrel spaced along the direction of feed of blown moldings, and a track for blown bottles also spaced in the same direction from the blowing mandrel. An assembly of openable die halves and grippers are reciprocable in unison along the feed path between a first station in which they are aligned respectively with the extruder and blowing mandrel, and a second station in which they are aligned respectively with the blowing mandrel and the track. During each cycle of movement of the die halves and grippers, (i) a parison is moved from the extruder to the blowing mandrel, (ii) a blown molding is moved from the blowing mandrel to the track, and (iii) the previous blown molding is shifted along the track. A device is included to exhaust the blown molding more rapidly, and/or to retain it on the blowing mandrel temporarily by suction.

4 Claims, 10 Drawing Figures

PATENTED MAY 2 1972

3,659,998

SHEET 1 OF 3

INVENTOR:
RONALD G. SAFFRON

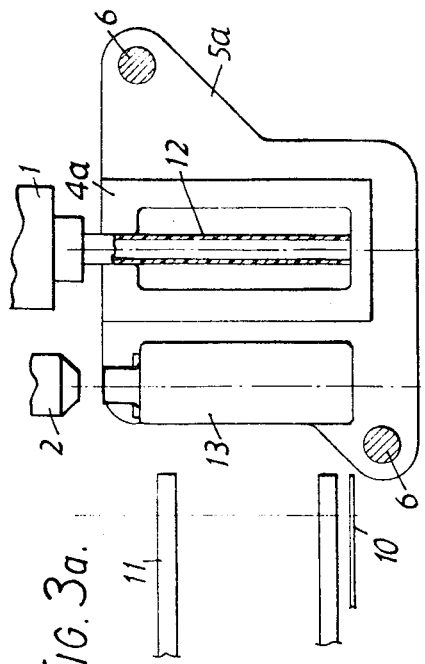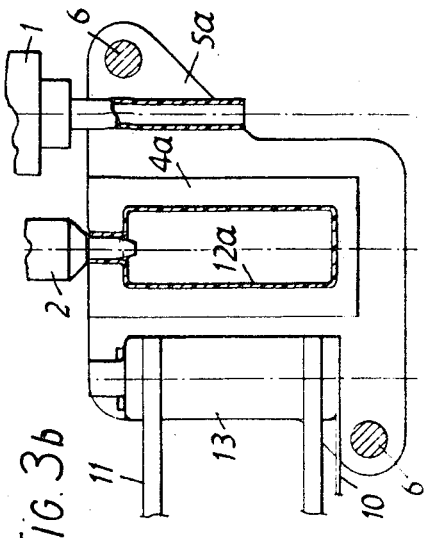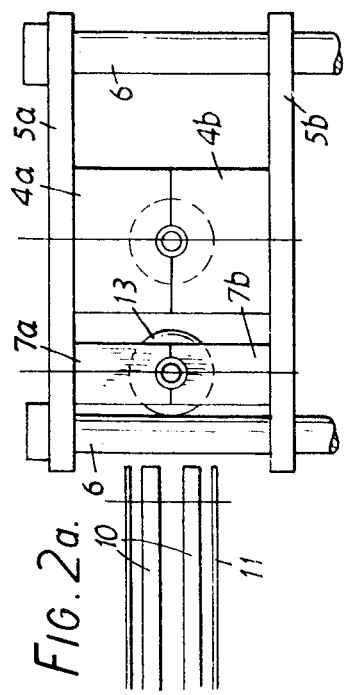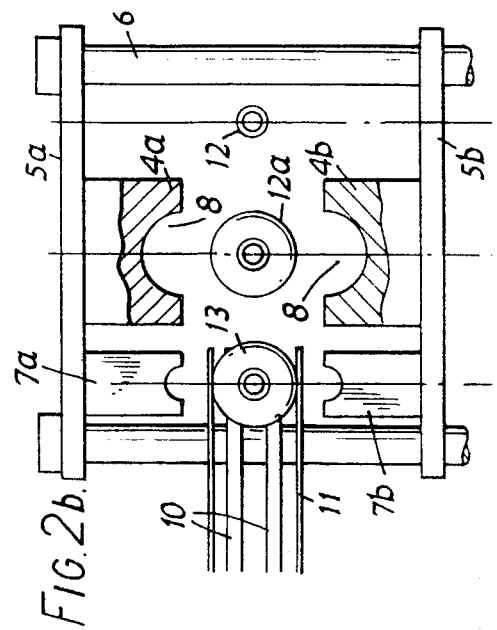

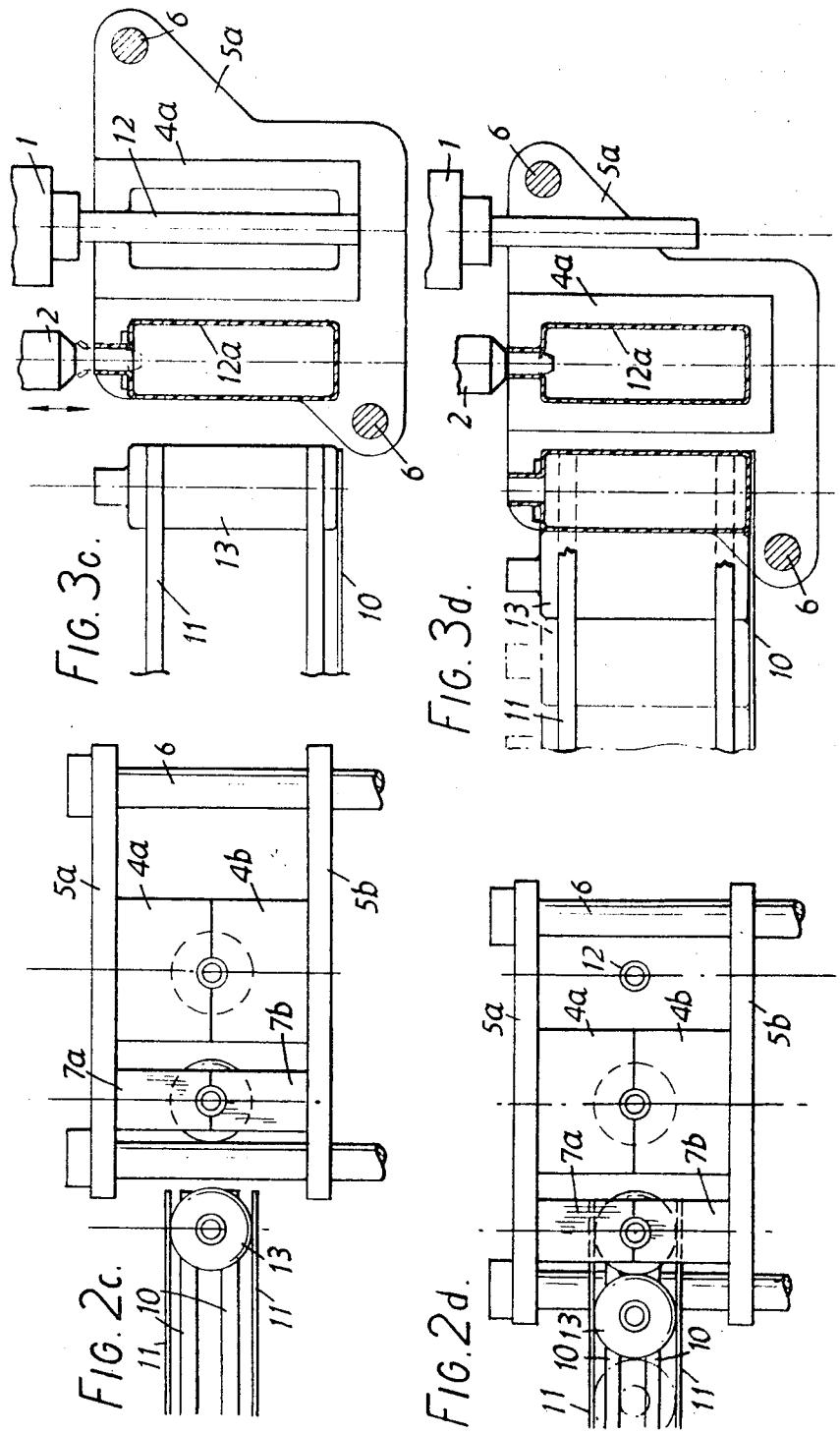

BLOW-MOLDING MACHINES

This invention relates to machines for the blow-molding of hollow articles, such as bottles, from thermoplastic material.

In some conventional blow-molding machines, the final stage in the sequence of operations is the cooling and hardening of the blown and finally shaped molding in a multi-part die, whereafter the molding is either simply released from the die or is ejected therefrom. In the simplest case, the blown molding is removed by hand from an opened die, whereas in other cases the blown molding is ejected from the die, or off a blowing mandrel, by application of compressed air.

One method of operating a blow-molding machine entails the reciprocation of a multi-part blowing die between a first station, in which it receives a parison from an extruder, and a second station in which a blowing mandrel enters to blow the parison to final shape within the die.

It is the object of the present invention to provide means in a blow-molding machine whereby at least part of a stroke of a reciprocating movement of a die serves for feeding of a blown molding along a feed path.

According to the present invention a blow-molding machine comprises an extruder for producing a tubular extrusion of heated softened thermoplastic material, a blowing mandrel spaced from the extruder along the direction of a feed path for blown moldings, said mandrel being reciprocable along its own axis normal to the feed path, a track spaced from the blowing mandrel in the same direction along the feed path and adapted to receive blown moldings, a pair of die halves and a pair of grippers, said die halves and grippers being reciprocable normal to the feed path for opening and closing thereof, the pairs of die halves and grippers being reciprocable in unison along the feed path between a first station in which the axis of the die is aligned with the axis of the extruder and the axis of the grippers is aligned with the axis of the blowing mandrel, and a second station in which the axis of the die is aligned with the axis of the blowing mandrel and the axis of the grippers is positioned over an end portion of the track.

In a preferred form of construction the machine comprises a pair of carriers which are reciprocable normally to the feed path, each carrier having mounted thereon a respective one of the die halves and a respective one of the grippers.

For improved exhausting of the blown molding, and if desired for holding of the blown molding temporarily on the blowing mandrel, there may be provided valve means adapted to connect the blowing mandrel selectively to a source of compressed air for blowing a molding, or to a source of suction for exhausting gas from a blown molding. For causing the blown molding to be temporarily retained on the blowing mandrel by atmospheric air pressure, the arrangement may be made such that the pressure within the blown molding is reduced below atmospheric.

Figure 4:
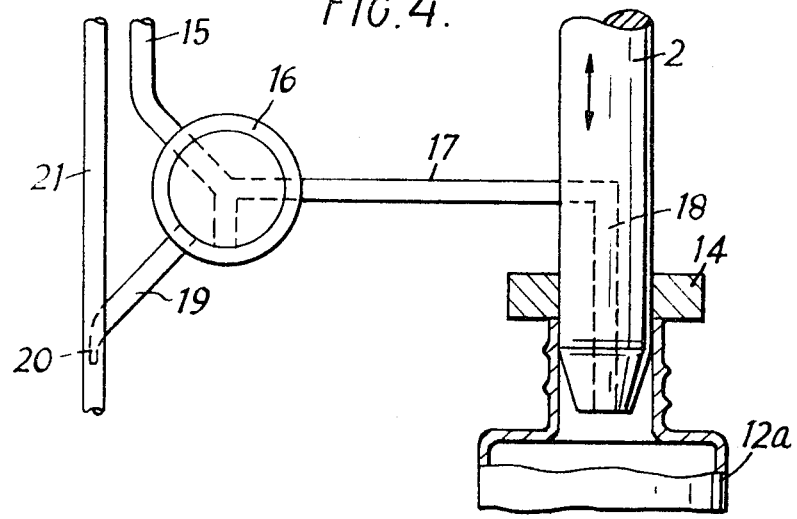

An embodiment of feeding means for a blow-molding machine, in accordance with the invention, is hereinafter particularly described with reference to the accompanying drawings, wherein:

FIG. 1 is a perspective elevation of parts of a blow-molding machine;

FIGS. 2a, 2b, 2c, and 2d are plan views showing relative positions of die halves and grippers in steps in the cycle of operation of the machine;

FIGS. 3a, 3b, 3c, and 3d are side views illustrating relative positions of the die and grippers with respect to an extruder, a blowing mandrel, and a track, during the cycle of operation of the machine;

FIG. 4 is a diagram to illustrate an improvement applied to a blowing mandrel.

Referring to FIG. 1, the blow-molding machine comprises an extruder head 1 arranged at a first station along the direction of a feed path and adapted to produce a tubular preform or parison of thermoplastic material in heated and softened state. At a second station on the feed path there is provided a blowing mandrel 2 which is vertically reciprocable along its axis, normal to the feed path, by means of a ram 3. A blowing die consists of two die halves 4a and 4b having internal cavities which together define the external shape of the eventual blown molding. Each die half is mounted on a respective carrier plate 5a or 5b, and opening and closing movements of the die halves 4a and 4b are obtained by relatively sliding, normal to the feed path, of one of the carrier plates on guide bars 6 secured to the other carrier plate. The carrier plates 5a and 5b are reciprocated by a ram (not shown).

On each carrier plate there is mounted a respective gripper bracket 7a or 7b each having a semi-circular recess 8 at its free end, the diameter of the circular opening formed by the two recesses being slightly less than the outside diameter of the neck portion of a bottle molding blown in the die. As the carrier plates move towards and away from each other, for closing and opening of the die, the gripper brackets are similarly moved toward and away from each other, for gripping and for releasing a blown molding.

In alignment with the axes of the extruder head 1 and blowing mandrel 2 there is provided a track 9 having bottom rails 10 to support blown moldings, and side rails 11 to keep them in a single line.

In a first position of the cycle of movements of the machine, the die halves are aligned with the extruder 1, see FIGS. 2a and 3a, and have closed together to grip a parison 12 of thermoplastic material issuing from the extruder 1.

Means for severing the extrusion between the extruder and die do not form part of the invention and have been omitted for clarity of the drawing.

At the same time, the gripper brackets 7a, 7b have closed together to grip the neck of a bottle 13 blown in a previous stage as explained below.

The assembly of carrier plates 5a, 5b, die halves and gripper brackets then moves in unison along the feed direction toward the track 9 until the (closed) die halves are in alignment with the blowing mandrel 2, see FIG. 3b. In this position, the bottle 13 has been carried onto the entry end of the track 9. The blowing mandrel then descends into the top of the die, and compressed air is introduced through it to blow the parison to the shape of the die cavity, as at 12a.

The carrier plates then move apart, thereby opening the die halves and leaving the blown moulding hanging on the blowing mandrel. The blown molding previously carried by the gripper brackets is released to stand on the track 9, see FIG. 2b.

The assembly of carrier plates, die halves, and gripper brackets then moves back again along the feed path (whilst still in open condition) until the axis of the die is aligned with the extruder 1, see FIG. 3c. Thereafter the carrier plates move towards each other again, causing the die halves to close onto a fresh parison 12 issuing from the extruder, whilst the gripper plates grip about the neck of the blown molding hanging on the blowing mandrel, see FIG. 2c.

The assembly of carrier plates, die halves, and gripper brackets (whilst in closed condition), then moves again along the feed path in the direction of the track 9 until the die is aligned with the blowing mandrel. The previous blown molding, carried by the gripper brackets, is moved onto the beginning of the track 9, and itself pushes the preceding blown molding further along the track, see FIGS. 2d and 3c.

Thus, once the machine has completed a first full cycle, each subsequent movement of the assembly in the direction of the track 9 results in (a) carriage of a parison towards the blowing station, and (b) carriage of a blown molding towards the track 9, and (c) shifting of a preceding blown molding further along the track 9.

Referring to FIG. 4 there is shown schematically an arrangement for improving exhausting of air and gases from the blown molding, and for retaining the blown molding on the blowing mandrel until time for its release.

The blowing mandrel 2 is reciprocated through a stripper plate 14. In the position shown, the blowing mandrel 2 is fully lowered and is engaged into the neck of a molding 12a which it has just blown. To blow the molding, compressed air is introduced, from any convenient source, through a conduit 15, a two-way valve 16, and a conduit 17, to the bore 18 of the mandrel. At a suitable instant after blowing has been completed, and the molding has hardened adequately, the two-way valve 16 is moved to its other position in which the conduit 17 is disconnected from the conduit 15 and is connected instead to a conduit 19 leading to a nozzle 20 arranged in a conduit 21 through which compressed air passes. The passage of air in conduit 21 causes suction in nozzle 20 and this suction is communicated to the interior of the blown molding and very rapidly exhausts from it any residual blowing air and residual gases. If the pressure in the blown molding is caused to become lower than atmospheric, the molding will be thereby held on the mandrel and against the stripper plate 14. Subsequently, the mandrel retracts through the stripper plate 14, and the blown moulding is free to be moved onwardly by the gripper brackets 7a, 7b.

The feed path movement of the die and grippers has been shown as linear, but the carrier assembly could move, between stations, about a pivot axis so as to result in an arcuate movement, as indicated by the arrow A in FIG. 1.

I claim:

1. A blow-molding machine comprising an extruder for producing a tubular extrusion of heated softened thermoplastic material, a blowing mandrel spaced from the extruder along the direction of a feed path for blown moldings, said mandrel being reciprocable along its own axis, normal to the feed path, a track spaced from the blowing mandrel in the same direction along the feed path and adapted to receive blown moldings, a pair of die halves and a pair of grippers, said die halves and grippers being reciprocable normal to the feed path for opening and closing thereof, the pairs of die halves and grippers being reciprocable in unison along the feed path between a first station in which the axis of the die is aligned with the axis of the extruder and the axis of the grippers is aligned with the axis of the blowing mandrel, and a second station in which the axis of the die is aligned with the axis of the blowing mandrel and the axis of the grippers is positioned over an end portion of the track.

2. A blow-molding machine, as claimed in claim 1, comprising a pair of carriers reciprocable normally to the feed path, each carrier having mounted thereon a respective one of the die halves and a respective one of the grippers.

3. A blow-molding machine, as claimed in claim 1, comprising valve means adapted to connect the blowing mandrel selectively to a source of compressed air for blowing a molding, and to a source of suction for exhausting gas from a blown molding.

4. A blow-molding machine, as claimed in claim 3, wherein the arrangement is such that the pressure within the blown molding is reduced below atmospheric to cause the blown molding temporarily to be retained by atmospheric air pressure on the blowing mandrel.

* * * * *